J. E. Chamberlin,
Scroll Sawing Machine.

Nº 83,362.      Patented Oct. 27, 1868.

Witnesses:
John R. Baylis
James Moore

Inventor:
Joseph E. Chamberlin

JOSEPH E. CHAMBERLIN, OF WILMINGTON, DELAWARE.

Letters Patent No. 83,362, dated October 27, 1868.

IMPROVEMENT IN JIG-SAWS.

The Schedule referred to in these Letters Patent and making part of the same.

*To all whom it may concern:*

Be it known that I, JOSEPH E. CHAMBERLIN, of the city of Wilmington, in the county of New Castle, and State of Delaware, have invented a new and improved "Jig-Saw," intended for sawing ship-timbers or other wood at any angle or bevel; and I do hereby declare that the following is a full, clear, and exact description of the construction and operation of the same, reference being had to the annexed drawings, making a part of this specification, in which—

Figure 1:
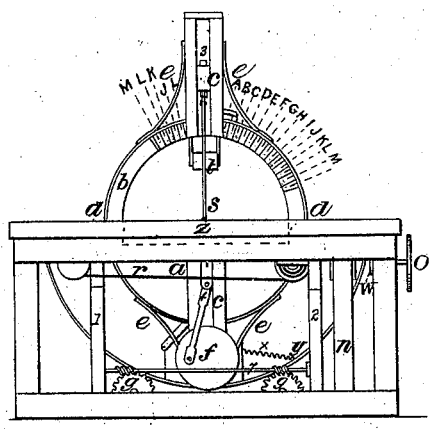
Figure 2:
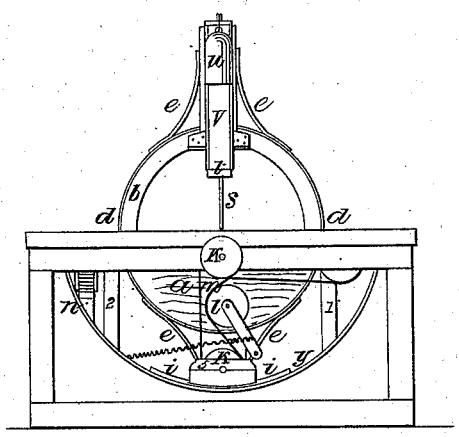
Figure 3:
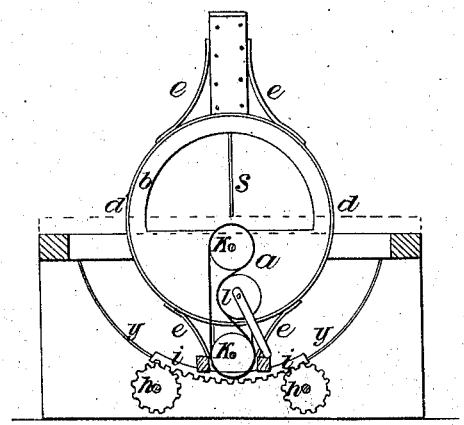
Figure 4:
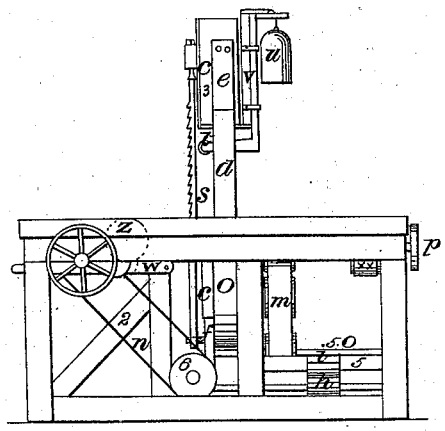

Figure 1 is a front view;
Figure 2 a rear view;
Figure 3 a section through the rear; and
Figure 4 a right-hand side view.

This saw is peculiarly adapted to the sawing of ship-timbers and other timber where a bevel is required.

I construct my table in the ordinary manner. In the centre of the table I set a circular timber, $b$, having its lower half, $a$, solid, and securely fastened to the centre horizontal timber of the table. Neatly fitted to this circular timber is an iron band, $d\ d$, to which the upper and lower slide blocks $c\ c$ are securely held by the braces $e\ e$, and upon which they traverse in moving the saw $s$ from a perpendicular position to the right or left. I provide a feed-roller, $z$, which is set in motion by means of a belt, $x\ x$, working on the main shaft, provided with a comb-pulley, and a belt working from that to another comb-pulley, upon which is a screw or worm, working into a cog-wheel upon the roller-shaft which is supported by and works upon two posts kept in place by the braces 1 2. This roller is thrown out of gear by the lever $w$.

The saw $s$ is set in motion and driven by the ordinary appliances, such as the belt $m$, pulley-wheels $k\ k$, crank-shaft 5 0, crank-wheel $f$, and pitman 4, and is kept tight by a steel coil-spring set inside the head-block at 3.

The saw $s$ is fixed in place between the upper and lower sliding head-blocks $c\ c$, and fastened in the ordinary manner.

Upon the outside face of the circular timber $b$, I affix a vernier-plate, and attach to the upper sliding head-block $c$ an index to mark the bevel produced by the saw in its motion to the right or left.

To move the saw out of a perpendicular position, I construct a carriage, to which the lower sliding head-block is fastened, and through and upon which the crank-shaft 5 0 works to traverse the semicircular ways $y\ y$. Under this carriage I fix a segment of a cog-wheel $i$, which gears into the pinions $h\ h$, which, by means of the pulley-band $n$ working over the pulley 6, which gives motion to the screw-shaft 7, and it in turn working into the pinions $g\ g$, which sit upon the same shaft with the pinions $h\ h$, set the segment $i$ in motion to the right or left, thus causing the rim or band $d\ d$, with the sliding head-blocks $c\ c$, to traverse the circular timber $b$, giving the saw $s$ any angle required to the right or left, indicated by the index and vernier-plate.

I also arrange, at the back of the saw $s$, the roller $t$, with sliding carriage and weight $u$, for holding the timber down to the table while sawing.

Having, in this description of the construction of my saw, necessarily given a clue to its operation, it only remains for me to say that whenever a slanting or bevelled cut is required, the operator turns the hand-wheel O to the right or left, as necessity requires, which, by means of the appliances already described, sets in motion the carriage 5, brings the saw to the angle required, which is determined by the index and vernier-plate. Any angle or bevel can be given while the saw is in motion.

I do not claim the wheels, cogs, worms, belts, cranks, pitmen, pinions, or vernier-plate, as I know these, have been long used in machinery; but What I do claim as my invention, and desire to secure by Letters Patent, is—

The circular timber $b$, with its vernier-plate and index, iron band $d\ d$, sliding head-blocks $c\ c$, braces $e\ e$, and saw $s$ in combination with the semicircular ways $y\ y$, carriage 5, segment $i$, pinions $g\ g$, $h\ h$, pulley 6, and their connecting or reciprocating appliances, constructed, arranged, and operating substantially as and for the purposes set forth.

JOSEPH E. CHAMBERLIN.

Witnesses:
W. WEST HICKMAN,
JOHN R. BAYLIS.